(Model.)

W. C. HOOKER.
GATE.

No. 257,330. Patented May 2, 1882.

WITNESSES:
Theo. G. Hoster
C. Sedgwick

INVENTOR:
W. C. Hooker
BY Munn &Co.
ATTORNEYS.

UNITED STATES PATENT OFFICE.

WILLIAM C. HOOKER, OF ABINGDON, ILLINOIS.

GATE.

SPECIFICATION forming part of Letters Patent No. 257,330, dated May 2, 1882.

Application filed December 17, 1881. (Model.)

*To all whom it may concern:*

Be it known that I, WILLIAM C. HOOKER, of Abingdon, Knox county, Illinois, have invented a new and useful Improvement in Gates, of which the following is a full, clear, and exact description.

Reference is to be had to the accompanying drawings, forming part of this specification, in which similar letters of reference indicate corresponding parts in all the figures.

Figure 1:
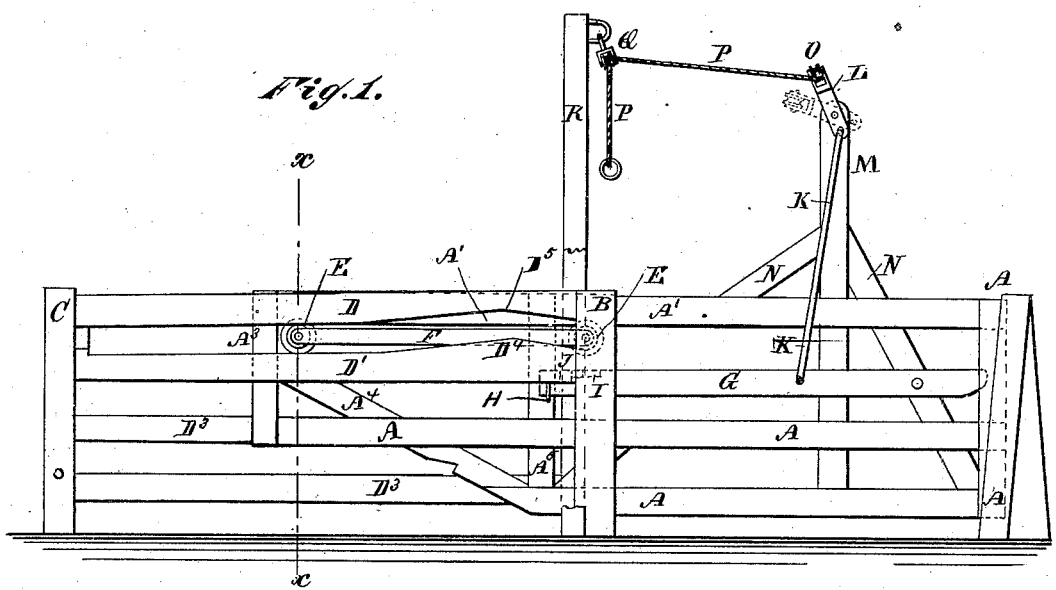
Figure 2:
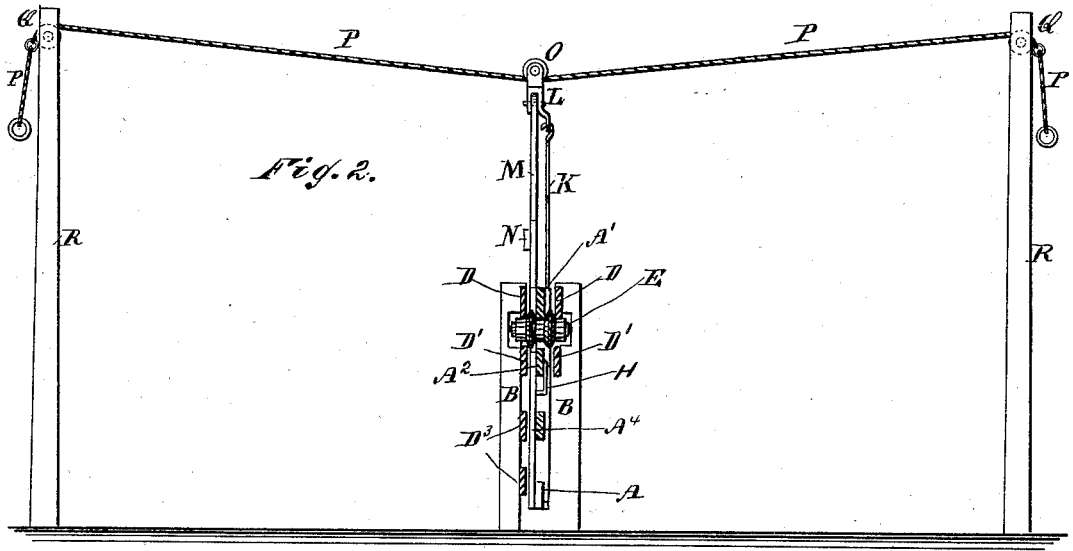
Figure 3:
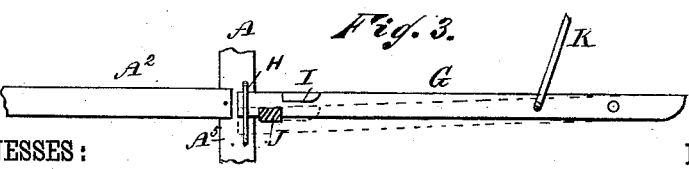
Figure 4:
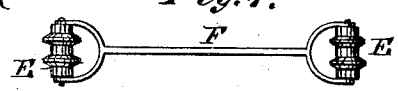

Figure 1 is a side elevation of my improved gate shown as closed. Fig. 2 is a sectional rear elevation of the same, taken through the line $x\ x$, Fig. 1. Fig. 3 is a side elevation of the latch and a part of the gate, and Fig. 4 is a plan view of the rollers and their connecting-bar.

This invention relates to that class of gates that move longitudinally across the roadway and are operated by cords extending along the roadway and supported by posts, and has for its object to facilitate the opening, closing, latching, and unlatching of the gates.

The invention consists in the combination, with the rearward extension of the gate and the double track that carries the gate, of the double-flanged rollers having hubs or extensions outside of the said flanges and the forked connecting-bar, between whose forks the said rollers are journaled, whereby the gate is made to move easily, as set forth; and also in the combination, with the track-bars and the connected rollers, of double inclines formed upon the said track-bars, whereby the momentum of the gate is made to carry the said gate more surely to the desired point, as will be hereinafter fully described.

A represents the gate, which is formed of longitudinal bars connected at their ends with upright bars. The top bar, $A'$, of the gate is extended to the rearward, and beneath it is placed a bar, $A^2$. The bars $A'\ A^2$ are connected at their rear ends by a cross-bar, $A^3$, and are strengthened in place by an inclined brace-bar, $A^4$, the rear end of which is attached to the bar $A^3$, and its forward end is attached to the lower rear corner of the gate A. The gate A moves back and forth between two pairs of posts, B C, to the upper part of which, upon both sides of the gate A, are attached pairs of bars D D' at the same distance apart as the bars $A'\ A^2$, and upon a level with the said bars $A'\ A^2$ of the gate.

To the lower part of the posts B C, upon one side of the gate, are attached bars $D^3$, which, in connection with the bars D D', form a fence-panel.

E are two rollers, which are placed loosely between the bars $A'\ A^2$ of the gate and the bars D D' upon each side of the gate. The rollers E have each two flanges, and are provided with hubs or extensions outside of said flanges, as shown in Fig. 4, which are placed upon opposite sides of the bars $A'\ A^2$, as shown in Fig. 2, to keep the said rollers in place. The rollers E are journaled to the forked ends of a connecting-bar, F, which is made of a length about equal to the rearward extension of the gate, so as to keep the said rollers in their proper relative positions. Upon the upper edge of the forward parts of the two bars D' are formed double-inclined projections $D^4$, and upon the lower edges of the forward parts of the bars D, directly over the projections $D^4$, are formed double-inclined recesses $D^5$, as shown in Fig. 1. With this construction, when the forward end of the gate becomes the heavier in closing the said gate, the rear roller E rises and rolls along the lower edges of the upper bars, D, and in opening the gate, when the rear end of the gate becomes the heavier, the rear roller E drops down upon the upper edges of the lower bars, D'. As the gate begins to move in either direction the rollers E also begin to move, so that the roller next the roadway will pass the apex of the double incline by the time the operating-cord has become straight, so that the said gate will complete its movement automatically. G is the gate-latch, which serves as one of the horizontal bars of the gate, and is pivoted near its forward end to a brace-bar, N, of the said gate, as shown in Fig. 1. The rear end of the latch G works in the keepers H, attached to the upright or cross-bar $A^5$ of the said gate.

To the upper part of the side of the latch G, near its rear end, is attached a block, I, the lower side of the forward end of which is beveled, as shown in Fig. 3, so as, when the gate is closed, to strike against, rise, and pass over the block J, attached to the forward end of the bar D', and drop down at the forward side of the said block J, fastening the gate closed until released by raising the rear end of the said latch G. To the latch G, a little in the rear of its pivot, is hinged the lower end of a connecting-rod, K, the upper end of which is hinged to the lower end of a short lever, L, pivoted to the upper end of an upright bar, M, attached to the gate A a little in front of its center. The upright M is strengthened in place by braces N, attached to it and to the gate A. To the upper end of the lever L is pivoted a pulley, O, around which passes the middle part of the cord P, the end parts of which pass over pulleys Q, attached to posts R, set in the ground upon the opposite sides of and at suitable distances from the posts B. The ends of the cord P hang in such positions that they can be conveniently reached and operated to open and close the gate by a person sitting in a vehicle at either side of the gateway. The cord P is kept from being drawn too far in either direction by knots or other stops formed upon or attached to it at a little distance from its ends.

With this construction, when the gate is closed and either end of the cord P is pulled, the first effect is to operate the lever L and raise the latch G, unfastening the gate, and the second effect is to draw the gate back and open it, the double incline $D^4$ and the momentum of the gate causing the gate to move on after the cord P has been drawn to a straight line between the posts R. In the same way, in closing the gate, after the cord P has been drawn to a straight line the double inclines $D^4$, in connection with the momentum of the gate, causes the said gate to move onward until it is fully closed and the latch G drops into place.

Having thus described my invention, I claim as new and desire to secure by Letters Patent—

1. The combination, with the rearward extensions $A'$ $A^2$ of the gate and the double track D $D'$, of the double-flanged rollers E, having hubs or extensions outside of the said flanges, and the forked connecting-bar F, between whose forks the said rollers are journaled, substantially as and for the purpose set forth.

2. In a gate, the combination, with the track-bars $D'$ and the connected rollers E, of the double inclines $D^4$, substantially as herein shown and described, whereby the momentum of the gate is made to carry the said gate more surely to the desired point, as set forth.

WILLIAM CHAUNCEY HOOKER.

Witnesses:
J. J. ROWE,
J. G. BEELER.